United States Patent
Ardisana, II et al.

(10) Patent No.: US 12,259,594 B2
(45) Date of Patent: Mar. 25, 2025

(54) ELECTRICAL CONNECTOR IN EYEWEAR

(71) Applicant: Snap Inc., Santa Monica, CA (US)

(72) Inventors: John Bernard Ardisana, II, Torrance, CA (US); Yoav Ben-Haim, Venice, CA (US); Teodor Dabov, Los Angeles, CA (US); Varun Sehrawat, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 337 days.

(21) Appl. No.: 16/711,133

(22) Filed: Dec. 11, 2019

(65) Prior Publication Data
US 2020/0233238 A1  Jul. 23, 2020

Related U.S. Application Data

(60) Provisional application No. 62/795,064, filed on Jan. 22, 2019.

(51) Int. Cl.
*G02C 11/00* (2006.01)
*G02C 5/14* (2006.01)
(Continued)

(52) U.S. Cl.
CPC ........... *G02C 11/10* (2013.01); *G02C 5/14* (2013.01); *H01R 13/443* (2013.01); *H02J 7/0045* (2013.01); *G02C 2200/08* (2013.01)

(58) Field of Classification Search
CPC .......... G02C 1/00; G02C 11/10; G02C 11/00; G02C 5/14; G02C 5/146; G02C 5/22;
(Continued)

(56) References Cited

U.S. PATENT DOCUMENTS 9,726,904 B1 * 8/2017 Lin .................... G06F 1/1635
9,952,452 B1   4/2018 Hanover et al.
(Continued)

FOREIGN PATENT DOCUMENTS

CN   203849511 U   9/2014
CN   208126047 U   11/2018
(Continued)

OTHER PUBLICATIONS

Machine translation of Niwa JP-2000180798-A (Year: 2000).*
(Continued)

*Primary Examiner* — Marin Pichler
(74) *Attorney, Agent, or Firm* — CM Law; Stephen J. Weed

(57) ABSTRACT

Eyewear that includes a frame supporting an optical element. The frame has a first side and a second side. The eyewear also includes a temple adjacent the first side of the frame. The temple includes a first portion adjacent the frame and a second portion releasably connected to the first portion. The eyewear also includes an electrical connector embedded within the first portion of the temple. The second portion conceals the electrical connector from an exterior of the eyewear when the second portion connects to the first portion in a concealed state, and exposes the electrical connector from the exterior of the eyewear when disconnected from the first portion in an exposed state.

18 Claims, 9 Drawing Sheets

(51) Int. Cl.
　　*H01R 13/443*　　(2006.01)
　　*H02J 7/00*　　(2006.01)
(58) Field of Classification Search
　　CPC .... G02C 2200/08; G02C 11/04; G02C 11/06;
　　　　　　G02C 5/18; G02C 5/16; H01R 13/443;
　　　　　　H02J 7/0045
　　USPC ...... 351/121, 111, 158, 41, 117, 178, 158.41
　　See application file for complete search history.

(56) References Cited

U.S. PATENT DOCUMENTS

| | | | |
|---|---|---|---|
| 2010/0296045 A1* | 11/2010 | Agnoli | G02C 5/146 |
| | | | 351/158 |
| 2015/0042947 A1 | 2/2015 | Barnett et al. | |
| 2017/0131575 A1 | 5/2017 | Howell et al. | |
| 2017/0255029 A1 | 9/2017 | Klosinski, Jr. et al. | |

FOREIGN PATENT DOCUMENTS

| | | | |
|---|---|---|---|
| CN | 208156330 U | | 11/2018 |
| JP | 2000180798 A | * | 6/2000 |
| JP | WO2004003634 A1 | * | 1/2004 |
| JP | 2016031442 A | | 3/2016 |

OTHER PUBLICATIONS

International Search Report and Written Opinion for International Application No. PCT/US2019/065780, dated Apr. 6, 2020 (Apr. 6, 2020)—12 pages.

2nd Chinese Office Action for Chinese Application No. 201980089925.9 dated Mar. 29, 2023, (9 pages)—English summary (1 page).

* cited by examiner

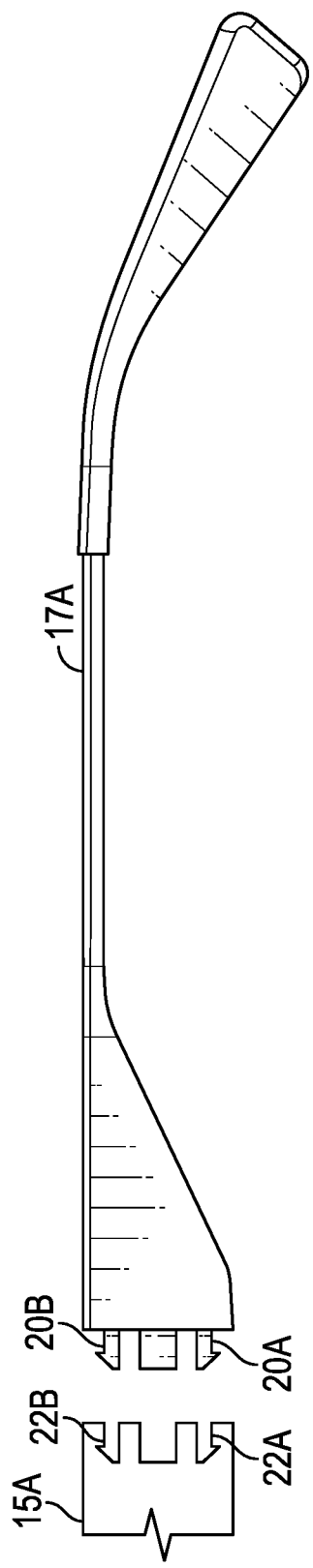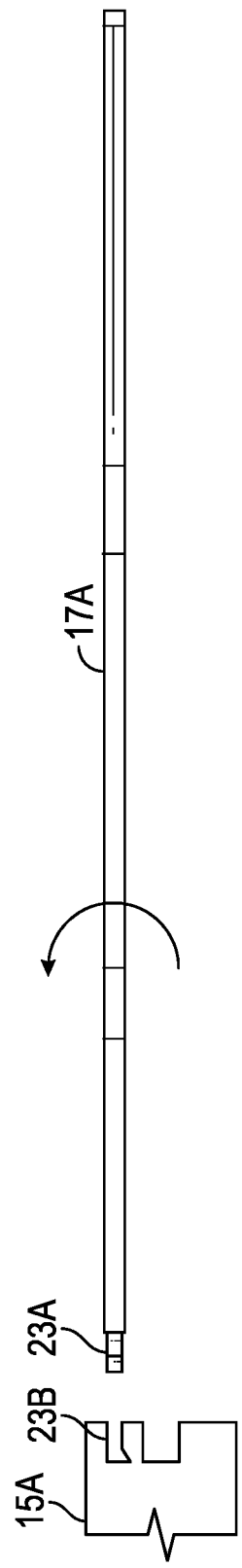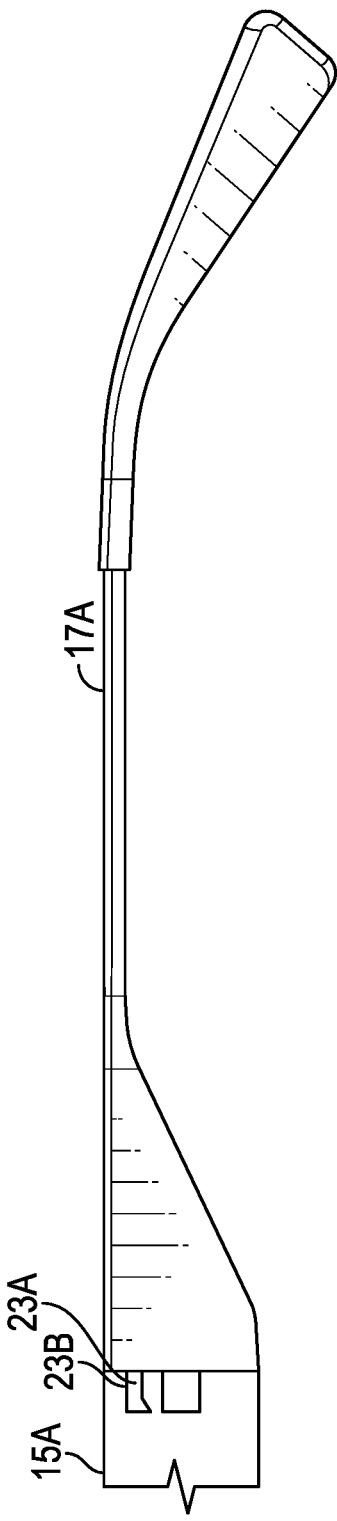
FIG. 2A
FIG. 2B
FIG. 2C

ELECTRICAL CONNECTOR IN EYEWEAR

CROSS-REFERENCE TO RELATED APPLICATIONS

This application claims priority to U.S. Provisional Application Ser. No. 62/795,064 entitled ELECTRICAL CONNECTOR IN EYEWEAR, filed on Jan. 22, 2019, the contents of which are incorporated fully herein by reference.

TECHNICAL FIELD

The present subject matter relates to eyewear having an electrical connector, and techniques for charging a battery in the eyewear.

BACKGROUND

Wearable devices are electronic devices incorporated into a garment or accessory that a user wears on their body. Presently, electronics enabled eyewear incorporates electronics and batteries for powering the electronics. The eyewear typically has electrical connectors such as cable connectors for charging the batteries. However, these electrical connectors often have large form factors that present challenges when incorporating into some contemporary eyewear designs.

BRIEF DESCRIPTION OF THE DRAWINGS

The drawing figures depict one or more implementations, by way of example only, not by way of limitations. In the figures, like reference numerals refer to the same or similar elements.

FIGS. 2A, 2B, and 2C are side views of eyewear temples depicting examples of insertion of one portion of the temple into another portion of the temple.

DETAILED DESCRIPTION

Figure 1A:
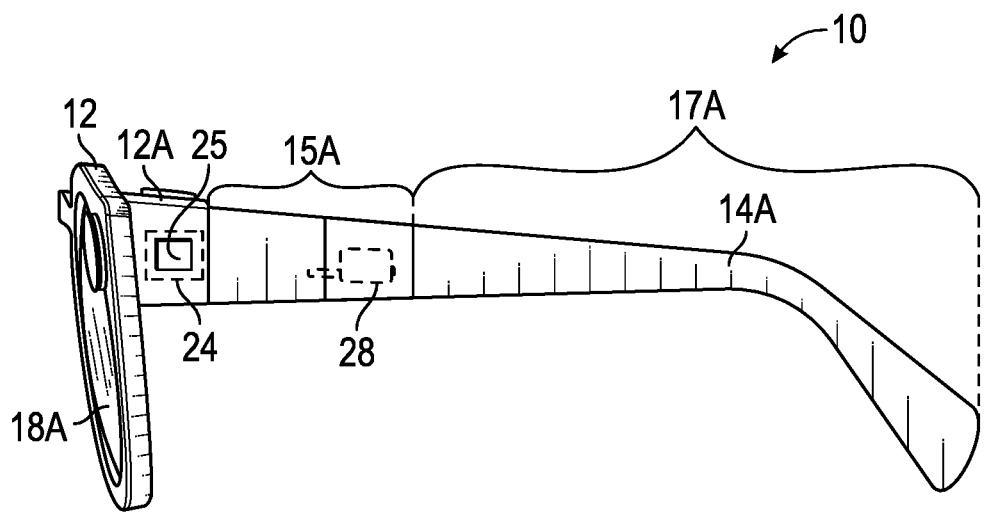
FIG. 1A is a side view of electronics enabled eyewear.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

This description of the exemplary embodiments that follows is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

The term "on" means directly supported by an element or indirectly supported by the element through another element integrated into or supported by the element. Non-limiting examples shown in the drawings give directions or orientations of the eyewear and associated components only for illustration and discussion purposes. In operation for charging the battery, the eyewear may be oriented in other direction suitable to the particular application of the eyewear device, for example up, down, sideways, or any other orientation.

Additional objects, advantages and novel features of the examples will be set forth in part in the following description, and in part will become apparent to those skilled in the art upon examination of the following and the accompanying drawings or they may learn by production or operation of the examples. The methodologies, instrumentalities and combinations particularly pointed out in the appended claims assist in realizing and ascertaining the objects and advantages of the present subject matter.

FIGS. 1A-1D show eyewear 10 according to one example. The eyewear 10 includes a frame 12 having two sides, a first side 12A and a second side 12B. The frame 12 supports optical element 18a on the first side 12A. The optical element 18a may be, for example, a lens, a transparent piece of glass or plastic, a screen, a projector, a display, or other device for presenting visual images and/or through which a user may perceive visual images. Although shown as having one optical element, the frame 12 can include other arrangements, such as two optical elements 18A and 18B on the first and the second sides 12a and 12b respectively (FIG. 1D) or may not include any optical element 18 depending on the application or intended user of the eyewear 10. The first side 12A of the frame 12 may be dimensioned to accommodate various electronic components 24, such as a battery 25, a wireless transceiver, a data storage means, and a processor (not shown).

The eyewear 10 also includes a temple 14a adjacent the first side 12A of the frame 12. The temple 14a includes a first portion 15A and a second portion 17A, which releasably connects to the first portion 15A. In one example, the first portion 15A is integrally formed with the frame 12. In another example, the first portion 15A connects to the frame 12 via a hinge 16A (FIG. 1D). The first portion 15A of the temple 14a includes an attachment point 13 where the first portion 15A of the temple 14a attaches to the second portion 17A. In one state (a concealed state; FIG. 1B), the second portion 17A is connected to the first portion 15A of the temple 14a at the attachment point 13 such that it covers an electrical connector 28 embedded within the first portion. In another state (an exposed state; FIG. 1C), the second portion 17A is released/removed from the first portion 15A of the temple 14A at the attachment point 13 to expose the electrical connector 28. In one example, the second portion 17A moves in a direction along a connection axis, e.g., an X-axis location coordinate (FIG. 1C) resulting in the exposed state.

In one example, the eyewear 10 includes a mechanical connector 26 (FIG. 1C) extending from the second portion 17A of the temple 14A. The mechanical connector 26 functions to connect the second portion 17A of the temple to the first portion 15A at the attachment point 13 resulting in the concealed state (FIG. 1B). The mechanical connector 26 also functions to enable disconnection of the second portion 17A of the temple from the first portion 15A at the attachment point 13 resulting in the exposed state (FIG. 1C). In one example, the mechanical connector 26 is adapted to mate with the electrical connector 28 with a friction fit retaining the mechanical connection 26 within the electrical connector 28 and, thereby, the second portion 17A attached to the first portion 15A. Some examples of the mechanical connector 26 includes a joint-type connection, a snap feature, a twist to lock connector, a release mechanism, a magnet etc.

Examples of the snap feature includes a snap-on connector, which is a coupling mechanism including corresponding protrusion and indentations on respective portions to enables connecting/mating with a straight push and disconnecting/unmating with a straight pull. A twist to lock connector is a coupling mechanism in which the connector connects with a straight push and then a twist to lock the second portion in place, and disconnects by twisting in an opposite direction to unlock the second portion from the first portion and then unmates with a straight pull. A release mechanism includes a connector that has a built-in lock/release collar to securely lock mated connectors and to enable quick disconnection by simply pulling on the release collar. For a magnet connection, the first or second portion of the temple may include a first magnet and the second or first portion of the temple may include metal or a second magnet. The second magnet is oriented to attract the first magnet in order to secure the second portion to the first portion in the concealed state while allowing disconnection of the second portion from the first portion to achieve the exposed state. Various other suitable connection techniques will be understood from the description herein.

Figure 1B:
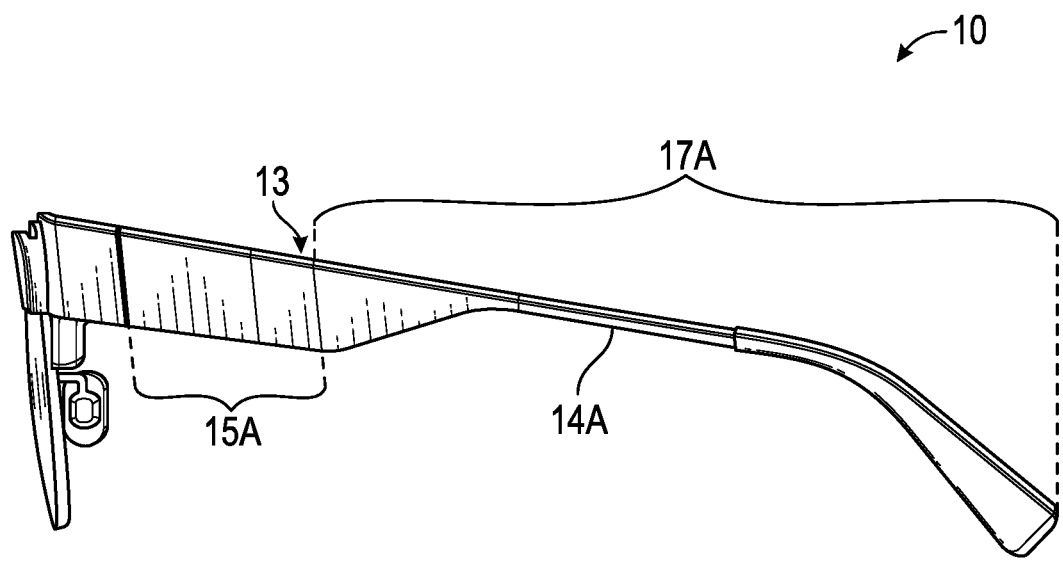
FIG. 1B is the side view of the eyewear of FIG. 1A with an electronic component concealed from an exterior of the eyewear.
Figure 1C:
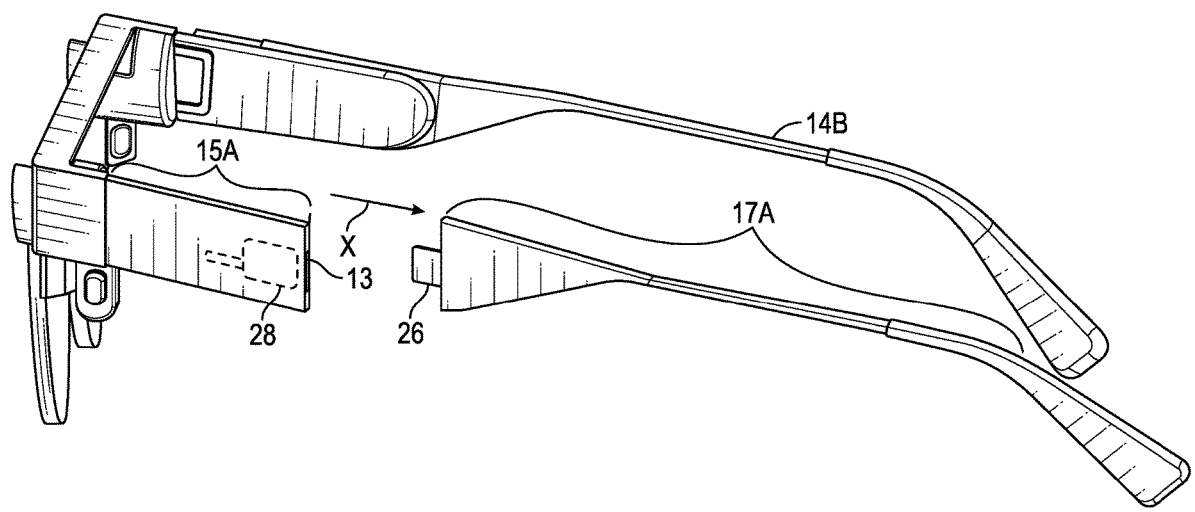
FIG. 1C is a disassembled side view of the eyewear of FIG. 1B with a portion of the temple removed from the eyewear and an electronic connector exposed from an exterior of the eyewear.
Figure 1D:
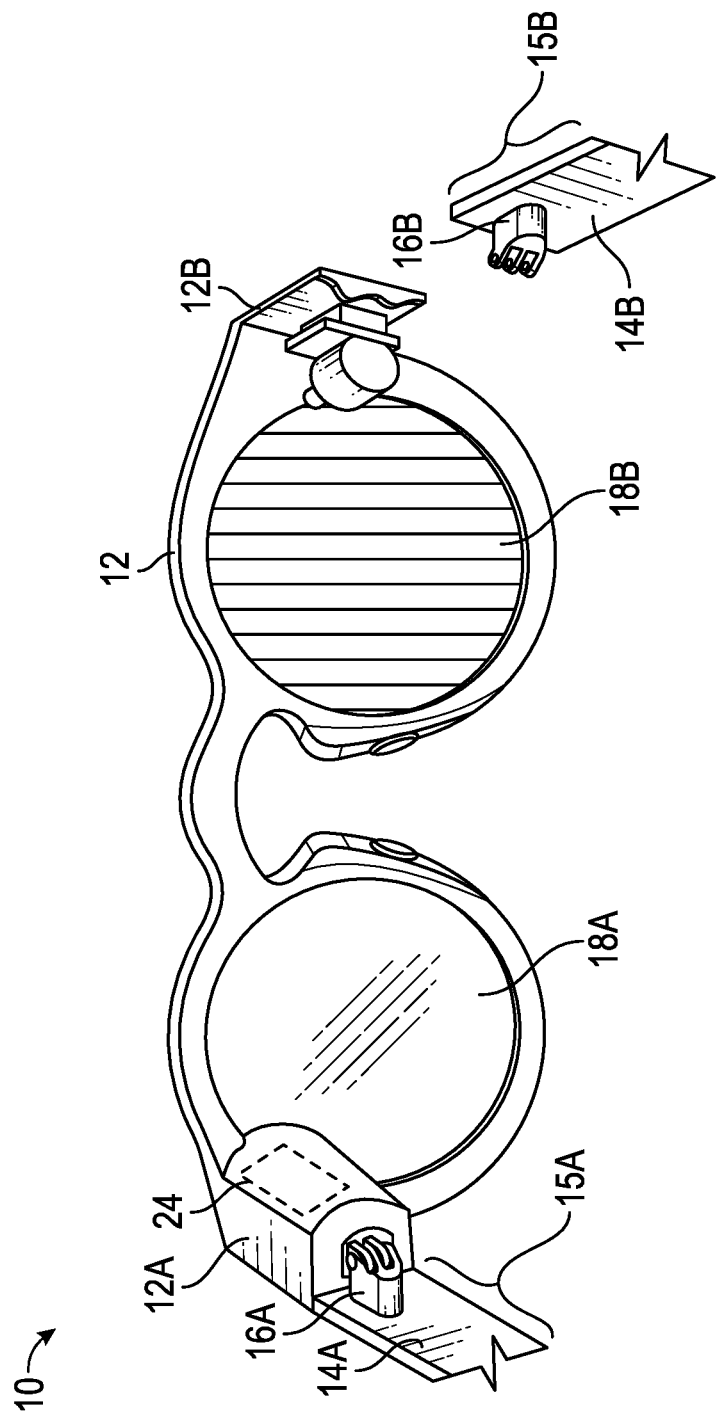
FIG. 1D is a partial rear view of the eyewear of FIG. 1A.

Eyewear 10 in FIGS. 1A and 1B also has a second temple 14B adjacent to the second side 12B of the frame 12 (FIG. 1C). In one example, the second temple 14B may have the same configuration as the first temple 14A such that the second temple 14B includes a first portion 15B and a second portion 17B (FIG. 1D) that is releasably attached to the first portion. In another example, the second temple 14B may be a single piece that does not include a releasable portion. In accordance with this example, the outer dimensions of the second temple 14B may be the same as the outer dimensions of the first temple 14A when the second portion 17A connects to the first portion 15A so that the eyewear 12 has symmetry. In one example, each of the first portions 15A and 15B of the temples 14A and 14B respectively are attached to the opposing sides 12A and 12B respectively of the frame 12 by first and second hinges 16A and 16B respectively (FIG. 1D).

In one example, the mechanical connector 26 is dimensioned to mate with the electrical connector 28 and disconnects from the electrical connector 28 of the first portion 15A of the temple 14A in the exposed state, which results in the electrical connector 26 being exposed from the exterior of the eyewear 10 (FIG. 1C). The electrical connector 28 is accessible to a user in the exposed state and is inaccessible to the user in the concealed state. For example, in the exposed state (FIG. 1C), the user can connect a power component (not shown) to the electrical connector 28, which functions to deliver power to the electrical component 24 in the frame 12. In another example, the mechanical connector 26 connects to the electrical connector 28 of the first portion 15A of the temple 14A in the concealed state, which results in the electrical connector 26 being concealed from an exterior of the eyewear 10 (FIG. 1B). In one example, the user wears the eyewear 10 in the concealed state. In one example, the electrical connector 26 is a cable type connector such as a USB type A, B, or C cable connector.

FIGS. 2A, 2B and 2C are side views depicting various examples of insertion of the second portion 17A of the temple 14A into the first portion of the temple 14A as described in detail herein below. In one example, the mechanical connector 26 includes snaps 20A and 20B, which are integrally attached to the second portion 17A of the temple 14A (FIG. 2A) and the first portion 15A defines grooves 22A and 22B for receiving and accommodating the snaps 20A and 20B respectively (FIG. 2A). In the example of FIG. 2A, the second portion 17A is inserted directly into the first portion 15A along a longitudinal insertion axis. Specifically, the snaps 20A and 20B are inserted into their corresponding grooves 22A and 22B (FIG. 2A).

In another example, the second portion 17A is first inserted into the first portion 15A along a longitudinal insertion axis (FIG. 2B) and then the second portion 17A is rotated to lock the second portion 17A in place (FIG. 2C) to conceal the electrical connector 28. Specifically, a protrusion 23A is initially inserted into a groove 23B (FIG. 2B). The second portion 17A is then rotated, causing the protrusion 23A to lock into place within the groove 23B (FIG. 2C) in order to firmly connect the second portion 17A to the first portion 15A of the temple 14A. The process may be reversed by rotating the second portion 17A/protrusion 23A in the opposite direction to unlock the protrusion 23A from the groove 23B and then pulling the second portion 17A out in order to remove the second portion 17A from the first portion 15A of the temple 14A.

In another example, the second portion 17A of the temple 14 is pivotably connected to the first portion 15A by a hinge 32 (FIG. 3) such that the second portion 17A is movable with respect to the first portion 15A between concealed and exposed states. For example, in the exposed state, the second portion 17A is moved away from the first portion 15A about an axis of rotation defined by the hinge 32, which disconnects the second portion 17A from the first portion 15A of the temple and exposes the electrical connector. In the concealed state, the second portion 17A connects to the first portion 15A about the axis of rotation defined by the hinge 32.

Figure 3:
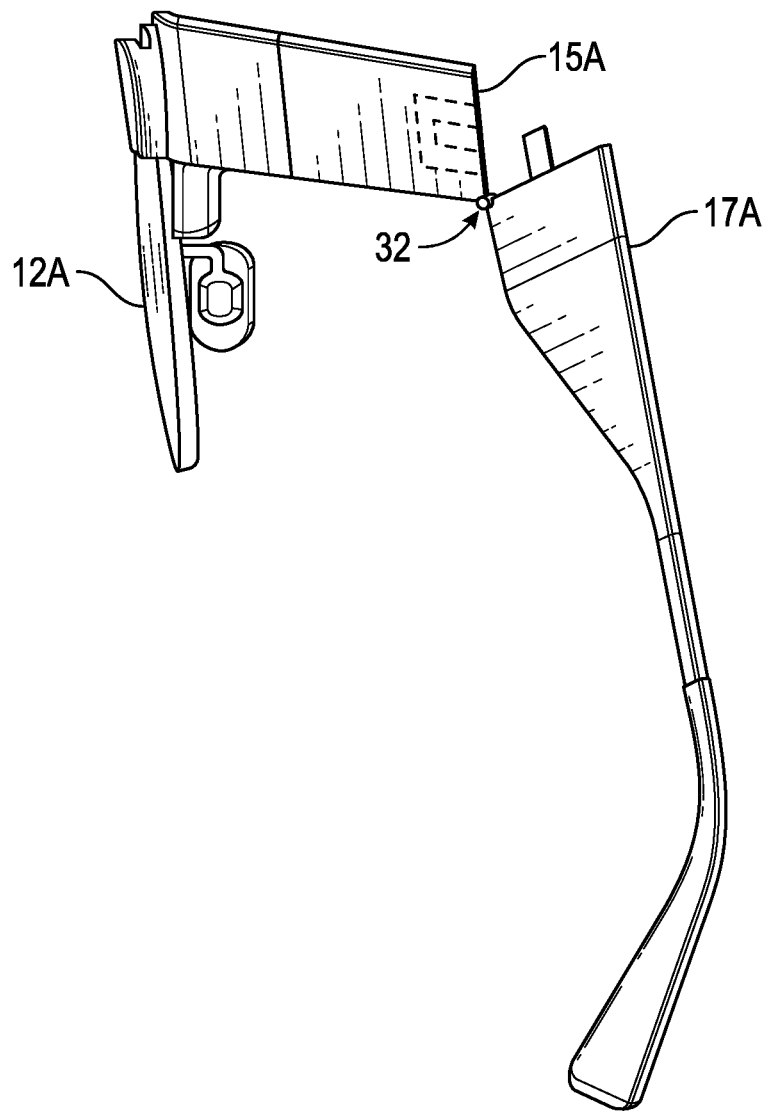
FIG. 3 is a side view of an example of a pivotal connection of a second portion of the temple with respect to a first portion of the temple connected to a frame.
Figure 3A:
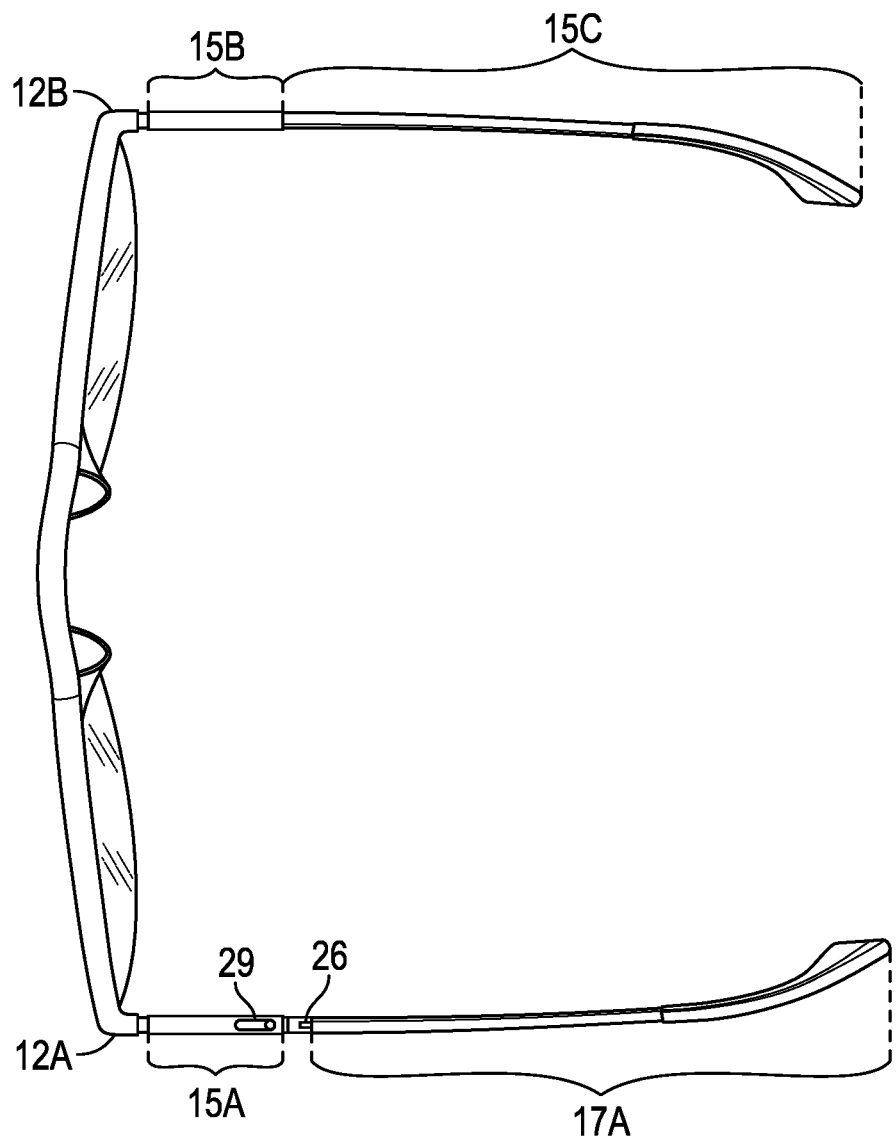
FIGS. 3A, 3B, and 3C are top views of eyewear depicting a second portion of the temple pivotally connected to a first portion of the temple.
Figure 3B:
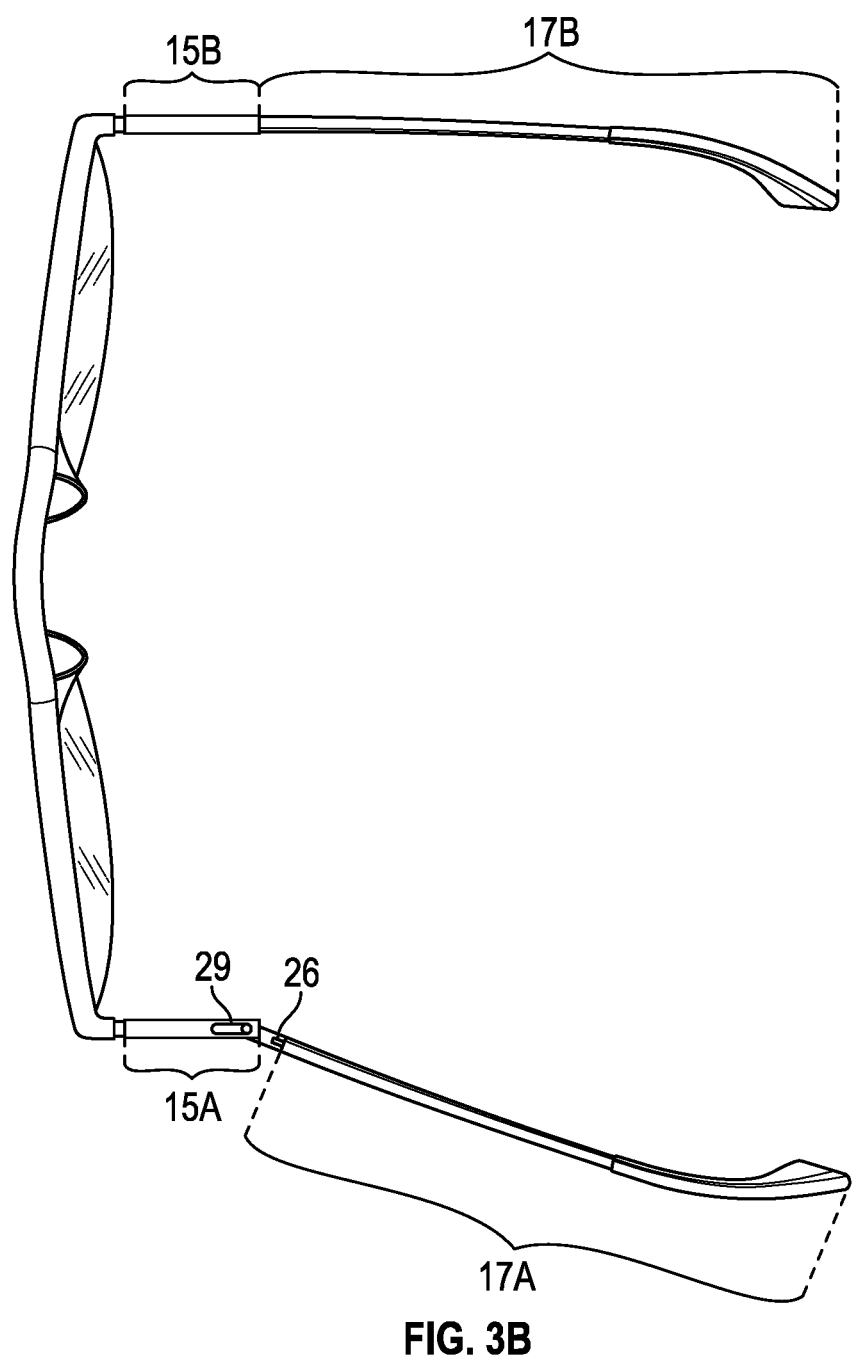
Figure 3C:
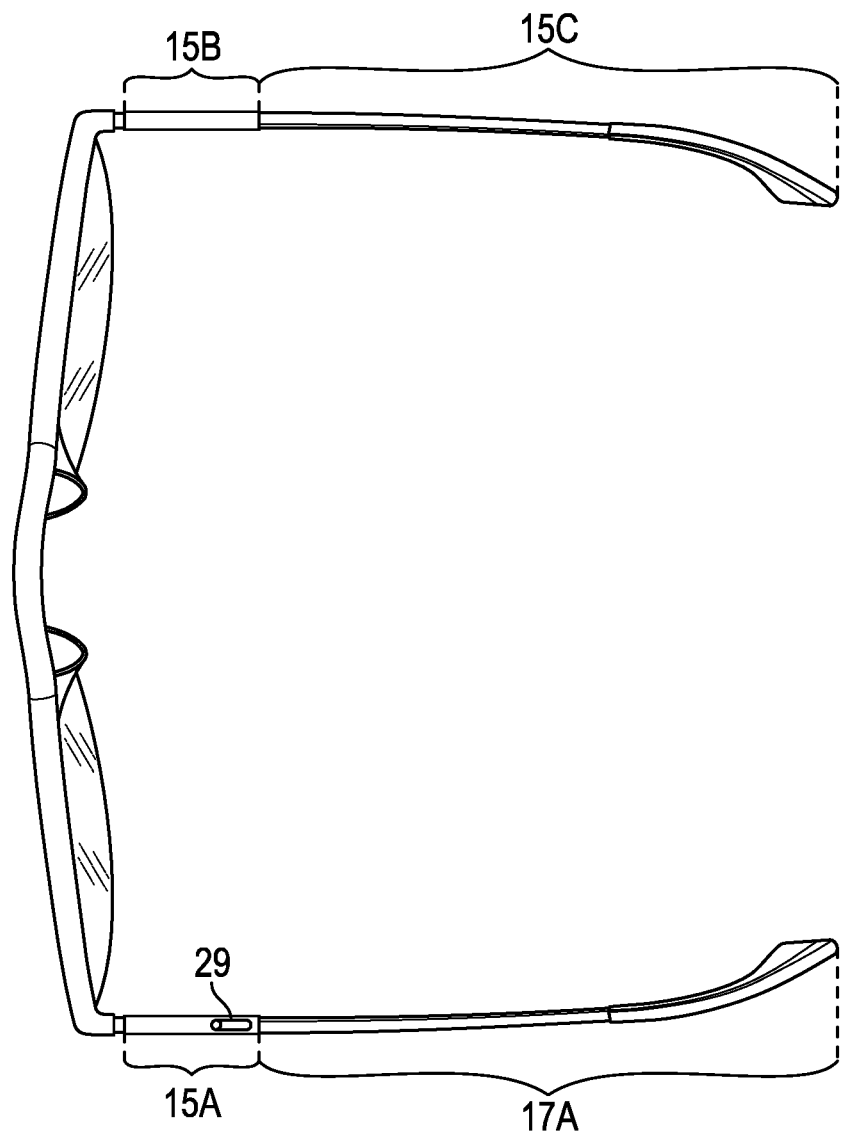

In one example, the second portion 17A is tethered to the first portion 15A via the hinge 32 to provide an attachment anchoring the second portion 17A for movement with respect to the first portion 15A. In FIG. 3, the hinge is positioned on the bottom of the temple to permit rotation of the second portion 17A in a vertical downward direction with respect to the first portion 15A. In FIGS. 3A-3C, the hinge is positioned adjacent the vertical surface of the temple to permit rotation of the second portion 17A in a horizontal direction with respect to the first portion 15A. The hinge 32 may be embedded within the first portion 15A and/or second portion 17A such that the hinge 32 is concealed from the user (FIG. 3C) or disposed on an exterior surface for the first portion 15A and/or second portion 15B. A mechanical connector may extend from the second portion 17A for establishing connection with the electrical connector 28 (e.g., via a friction fit) to secure the second portion 17A in place with respect to the first portion 15A. The mechanical connector may be smaller than the opening of the electrical connector to permit a smooth rotation into engagement.

In another example, the first portion 15A of the temple may define a passage in which the second portion 17A may be inserted. The first portion 15A may include a channel 29 that guides and constrains a prong on the second portion 17A. In use, the second portion 17A may be disconnected from the first portion 15A in a concealed state by first moving the second portion 17A away from the first portion 15A along a connection axis (with movement constrained by the channel 29) until the second portion 17A is free of the passage defined by the first portion 15A. The second portion 17A can then be rotated outward into an exposed state of the temple about an axis defined by the prong on the second portion 17A within the channel 29 to expose the electrical connector 28 in the first portion 15A. The temple returns to the concealed state by rotating the second portion 17A inward about an axis defined by the prong on the second portion 17A within the channel 29 and reinserting the second portion 17A into the passage of the first portion 15A.

Figure 4:
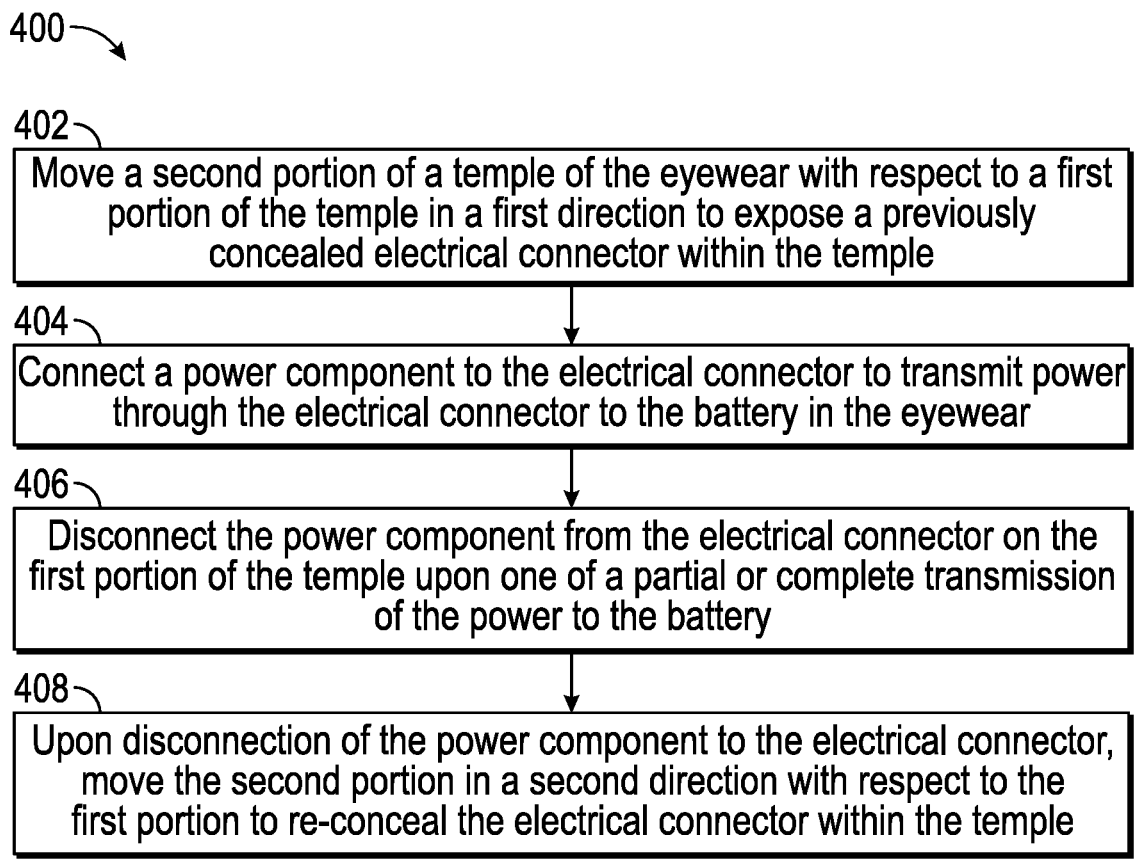
FIG. 4 is a flowchart depicting an example of steps for charging an eyewear battery.

FIG. 4 is a flowchart of a charging example using the electrical connector to charge a battery in the eyewear. The steps are described with reference to the eyewear depicted in FIGS. 1A and 1C. One of skill in the art will understand from the description herein that the method may be implemented using other types of eyewear with different connectors for transitioning between the first and second states of the temples.

At step 402, place the temple in an exposed state by moving a second portion 17A of a temple 14A of the eyewear 10 with respect to a first portion 15A of the temple 14A in a first direction (e.g., along a connection axis), thereby exposing a previously concealed electrical connector 28 within the temple 14A. In one example, moving the second portion 17A of the temple 14A in the first direction disconnects the second portion 17A of the temple 14A from the first portion 15A (FIG. 1C).

At step 404, connect a power component to the electrical connector 28 to transmit power through the electrical connector 28 to the battery in the eyewear 10. At step 406, disconnect the power component from the electrical connector 28 on the first portion of the temple upon one of a partial or complete transmission of the power to the battery. At step 408, upon disconnection of the power component to the electrical connector 28, place the temple in a concealed state by moving the second portion in a second direction with respect to the first portion to re-conceal the electrical connector within the temple (FIG. 1B). In one example, the second direction is opposite to the first direction. In one example, moving the second portion in the second direction connects the second portion with the first portion of the temple.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. Eyewear comprising:
    a frame configured to support an optical element, wherein the frame has a first side and a second side;
    a first hinge connected to the first side of the frame;
    a temple connected by the first hinge to the first side of the frame, the temple comprising a second portion and a first portion defining a hollow passage that is sized and shaped to slidably receive the second portion along a longitudinal insertion axis into the hollow passage, the temple having a concealed state characterized by the second portion at least partly inserted into the passage and an exposed state characterized by the second portion at least partly withdrawn from the passage,
    wherein the hollow passage comprises one or more outer walls;
    a channel extending through at least one of the one or more outer walls and parallel to the longitudinal insertion axis;
    a prong extending from the second portion toward and at least partially into the channel, wherein the prong defines an axis of rotation orthogonal to the longitudinal insertion axis, and wherein the prong is sized and shaped to be slidably engaged within the channel, such that the prong and the channel cooperate to restrain the second portion to linear movement parallel to the longitudinal insertion axis when the temple is in the concealed state, wherein the prong and the channel cooperate to mechanically couple the second portion to the first portion when the temple is in either the concealed state or the exposed state, and wherein, when the temple is in the exposed state, the prong permits rotation of the second portion relative to the first portion about the axis of rotation; and an electrical connector embedded within the first portion of the temple, such that the electrical connector is concealed from an exterior of the eyewear in the concealed state of the temple when the second portion covers the electrical connector embedded within the first portion, and such that the electrical connector is exposed from the exterior of the eyewear in the exposed state of the temple when the second portion is rotated about the prong and the second portion does not cover the electrical connector embedded within the first portion.

2. The eyewear of claim 1, wherein the second portion is movable with respect to the first portion between the concealed state and the exposed state.

3. The eyewear of claim 1, wherein the prong slidably engaged within the channel serves as an attachment point between the first portion of the temple and the second portion of the temple.

4. The eyewear of claim 3, further comprising a mechanical connector extending from the second portion of the temple and supporting the prong, wherein the mechanical connector is sized and shaped to:
connect the second portion to the first portion at the attachment point resulting in the electrical connector being at least partly concealed from the exterior of the eyewear when the temple is in the concealed state; and
at least partly disconnect the second portion from the first portion at the attachment point resulting in the electrical connector being exposed from the exterior of the eyewear when the temple is in the in the exposed state.

5. The eyewear of claim 4, wherein the mechanical connector is a joint-type connector.

6. The eyewear of claim 4, wherein the mechanical connector is not exposed from an exterior of the eyewear when the temple is in the concealed state.

7. The eyewear of claim 4, wherein the mechanical connector is exposed from an exterior of the eyewear when the temple is in the exposed state.

8. The eyewear of claim 1, wherein the electrical connector is accessible to a user when the temple is in the exposed state and inaccessible to the user when the temple is in the concealed state.

9. The eyewear of claim 1, further comprising:
an electrical component positioned within the frame and coupled to the electrical connector, wherein the electrical connector is configured to provide power to the electrical component.

10. The eyewear of claim 1, wherein the electrical connector is configured to be connected to a power component when the temple is in the exposed state.

11. The eyewear of claim 1, wherein the electrical connector is a cable-type connector.

12. The eyewear of claim 1, further comprising another temple and a second hinge connecting the other temple to the second side of the frame, wherein outer dimensions of the second temple are the same as outer dimensions of the first temple when the second portion of the temple is connected to the first portion of the temple.

13. The eyewear of claim 4,
wherein the mechanical connector establishes a connection with the electrical connector when the temple is in the concealed state, and
wherein the first portion defines an opening sized and shaped to receive the mechanical connector as the second portion of the temple is rotated into engagement with the first portion about the axis of rotation defined by the prong.

14. A method for charging a battery in eyewear, the eyewear having a frame, a first hinge connected to the frame, and a temple connected to the frame by the first hinge,
wherein the temple comprises a second portion and a first portion defining a hollow passage sized and shaped to slidably receive the second portion along a longitudinal insertion axis into the hollow passage, wherein the hollow passage comprises one or more outer walls,
wherein the first portion comprises a channel extending through at least one of the one or more outer walls and parallel to the longitudinal insertion axis, and
wherein the method comprises:
providing a prong that extends from the second portion toward and at lease partially into the channel, wherein the prong defines an axis of rotation orthogonal to the longitudinal insertion axis, and wherein the prong is sized and shaped to be slidably engaged within the channel, such that prong and the channel cooperate to restrain the second portion to linear movement parallel to the longitudinal insertion axis when the temple is in a concealed state;
at least partly withdrawing the second portion from the hollow passage;
the second portion about the axis of rotation while the prong remains within the channel, thereby moving the temple between the concealed state in which an electrical connector is concealed within the temple and an exposed state in which the electrical connector is exposed; and
connecting a power component to the electrical connector to transmit power through the electrical connector to the battery in the eyewear when the temple is in the exposed state.

15. The method of claim 14, wherein moving the second portion of the temple in a first direction along the longitudinal insertion axis at least partly disconnects the second portion of the temple from the first portion of the temple.

16. The method of claim 15, further comprising disconnecting the power component from the electrical connector on the first portion of the temple upon one of a partial or complete transmission of the power to the battery.

17. The method of claim 16, further comprising:
disconnecting the power component from the electrical connector;
rotating the second portion about the axis of rotation; and
moving the second portion in a second direction along the longitudinal insertion axis with respect to the first portion to at least partly re-conceal the electrical connector within the temple, wherein the second direction is opposite to the first direction.

18. The method of claim 17, wherein moving the second portion of the temple in the second direction further comprises connecting the second portion of the temple with the first portion of the temple.

* * * * *